(12) United States Patent
Acharya

(10) Patent No.: US 12,354,360 B2
(45) Date of Patent: Jul. 8, 2025

(54) METHOD TO OPERATE MULTIPLE SENSORS FOR MULTIPLE INSTANCES OF INTERCONNECTED HUMAN ACTIVITY RECOGNITION

(71) Applicant: Hitachi, Ltd., Tokyo (JP)

(72) Inventor: Joydeep Acharya, Milpitas, CA (US)

(73) Assignee: HITACHI, LTD., Tokyo (JP)

( * ) Notice: Subject to any disclaimer, the term of this patent is extended or adjusted under 35 U.S.C. 154(b) by 465 days.

(21) Appl. No.: 17/883,590

(22) Filed: Aug. 8, 2022

(65) Prior Publication Data

US 2024/0046650 A1    Feb. 8, 2024

(51) Int. Cl.
*G06V 20/52* (2022.01)
*G06V 10/72* (2022.01)
(Continued)

(52) U.S. Cl.
CPC .............. *G06V 20/52* (2022.01); *G06V 10/72* (2022.01); *H04N 7/181* (2013.01);
(Continued)

(58) Field of Classification Search
CPC ........ G06V 20/52; G06V 10/72; H04N 7/181; H04N 23/661; H04W 88/16; H04W 4/20
See application file for complete search history.

(56) References Cited

U.S. PATENT DOCUMENTS

| | | | |
|---|---|---|---|
| 11,747,821 B1 * | 9/2023 | Clise | G06Q 10/08 700/228 |
| 2010/0110183 A1 * | 5/2010 | Bobbitt | G06V 10/25 382/103 |

(Continued)

FOREIGN PATENT DOCUMENTS

WO    2020054876 A1    3/2020

OTHER PUBLICATIONS

"Task Assignment in Camera Networks: a Reactive Approach for Manufacturing Environments" Samer Hanoun, Asim Bhatti, Doug Creighton, Saeid Nahavandi, Phillip Crothers, and Gary Carroll. IEEE Systems Journal, vol. 12, No. 1, Mar. 2018 (Year: 2018).*

(Continued)

*Primary Examiner* — John Villecco
*Assistant Examiner* — Alexander John Rodgers
(74) *Attorney, Agent, or Firm* — Procopio, Cory, Hargreaves & Savitch LLP

(57) ABSTRACT

Example implementations described herein involve systems and methods that involve recognizing, from sensor data, an area from the plurality of areas and a candidate task from the one or more candidate tasks associated with the area; estimating a probability of each of the plurality of candidate tasks for the each of the plurality of areas for a specific future period of time, based on referencing historical data of task sequences previously executed; accepting the ones of the plurality of candidate tasks for the each of the plurality of areas having the probability being higher than a threshold; and scheduling one or more sensors to activate and transmit in the specific future period of time in associated areas for the plurality of areas associated with other ones of the plurality of candidate tasks for the each of the plurality of areas not having the probability being higher than the threshold.

15 Claims, 12 Drawing Sheets

(51) Int. Cl.
*H04N 7/18* (2006.01)
*H04N 23/661* (2023.01)
*H04W 4/20* (2018.01)
*H04W 88/16* (2009.01)

(52) U.S. Cl.
CPC ............ *H04N 23/661* (2023.01); *H04W 4/20* (2013.01); *H04W 88/16* (2013.01)

(56) References Cited

U.S. PATENT DOCUMENTS

| | | | | |
|---|---|---|---|---|
| 2012/0077531 | A1* | 3/2012 | Acharya | H04W 72/542 455/507 |
| 2017/0119283 | A1* | 5/2017 | Ten Kate | A61B 5/7203 |
| 2020/0044961 | A1* | 2/2020 | Shomura | H04L 67/12 |
| 2020/0394589 | A1* | 12/2020 | Trivelpiece | G06V 20/52 |
| 2020/0401981 | A1* | 12/2020 | Nagayoshi | G09B 19/00 |
| 2021/0252706 | A1* | 8/2021 | Zanchettin | B25J 9/1602 |
| 2021/0375492 | A1* | 12/2021 | Walker | G06N 20/00 |
| 2021/0389817 | A1* | 12/2021 | Spinelli | G06N 5/01 |
| 2022/0012502 | A1* | 1/2022 | Klinkigt | G06V 20/41 |
| 2022/0106122 | A1* | 4/2022 | Tie | B65G 1/0407 |
| 2022/0277231 | A1* | 9/2022 | Ostergaard | G06N 20/20 |
| 2022/0358311 | A1* | 11/2022 | Maeda | G06V 20/40 |
| 2022/0366353 | A1* | 11/2022 | Takeda | H04W 4/30 |
| 2023/0022356 | A1* | 1/2023 | Walker | G06V 40/103 |
| 2023/0031390 | A1* | 2/2023 | Serizawa | G05B 19/4155 |
| 2023/0306325 | A1* | 9/2023 | Cortese | G06Q 10/087 |

OTHER PUBLICATIONS

M. Condoluci, T. Mahmoodi Softwarization and virtualization in 5G mobile networks: Benefits, trends and challenges M. Condoluci, T. Mahmoodi / Computer Networks 146 (2018) 65-84. May 21, 2018 (Year: 2018).*

* cited by examiner

| Task ID | Description |
|---|---|
| $T_0$ | Null (no action) |
| $T_1$ | Pick Item from Shelf |
| $T_2$ | Place Item in Cart |
| $T_3$ | Push Cart |
| $T_4$ | Pick Item from Cart |
| $T_5$ | Place Item in Shelf |
| .. | |

FIG. 5

| Area | Task Set |
|---|---|
| 1 | $S_1 = \{T_0, T_1, T_2\}$ |
| 2 | $S_2 = \{T_0, T_3\}$ |
| 3 | $S_3 = \{T_0, T_4, T_5\}$ |
| .. | |

FIG. 6

| Task ID | Statistics of Task Completion Time | | |
|---|---|---|---|
| | Mean | Std. Deviation | Distribution |
| $T_0$ | $\mu_0$ | $\sigma_0$ | $f_0(\mu_0, \sigma_0)$ |
| $T_1$ | $\mu_1$ | $\sigma_1$ | $f_1(\mu_1, \sigma_1)$ |
| $T_2$ | $\mu_2$ | $\sigma_2$ | $f_2(\mu_2, \sigma_2)$ |
| $T_3$ | $\mu_3$ | $\sigma_3$ | $f_3(\mu_3, \sigma_3)$ |
| $T_4$ | $\mu_4$ | $\sigma_4$ | $f_4(\mu_4, \sigma_4)$ |
| $T_5$ | $\mu_5$ | $\sigma_5$ | $f_5(\mu_5, \sigma_5)$ |
| .. | | | |

FIG. 7

| Task ID | Probability of Next Task Completion of Current Task | | | | | | |
|---|---|---|---|---|---|---|---|
| | $T_0$ | $T_1$ | $T_2$ | $T_3$ | $T_4$ | $T_5$ | ... |
| $T_0$ | $p_{00}$ | $p_{01}$ | $p_{02}$ | $p_{03}$ | $p_{04}$ | $p_{05}$ | ... |
| $T_1$ | $p_{10}$ | 0 | $p_{12}$ | 0 | 0 | 0 | ... |
| $T_2$ | $p_{20}$ | $p_{21}$ | 0 | $p_{33}$ | 0 | 0 | ... |
| $T_3$ | $p_{30}$ | 0 | 0 | 0 | 0 | 0 | ... |
| $T_4$ | $p_{40}$ | 0 | 0 | 0 | 0 | $p_{45}$ | ... |
| $T_5$ | $p_{50}$ | 0 | 0 | 0 | $p_{54}$ | 0 | ... |
| .. | | | | | | | |

FIG. 8

| Area | Determined Tasks in Time Window | | |
|---|---|---|---|
| | Time = t-(K-1) | ... | Time = t | Time = t |
| 1 | | | | |
| 2 | | | | |
| 3 | | | | |
| .. | | | | |

FIG. 10

| Operation | Periodicity |
|---|---|
| Initialization Module, 100 | One time at beginning |
| Factory Systems 101a, Human I/P 101b | Occasionally, as and when needed |
| Updating Task Description Table and Area to Task Mapping Table of Historical Task Sequence DB | Occasionally, as and when needed |
| Updating Task Duration Table and Area to Task Sequence Table of Historical Task Sequence DB | Every Ts time units |
| All other modules | Every Ts time units |

FIG. 13

METHOD TO OPERATE MULTIPLE SENSORS FOR MULTIPLE INSTANCES OF INTERCONNECTED HUMAN ACTIVITY RECOGNITION

BACKGROUND

Field

The present disclosure is generally directed to factory systems, and more specifically, to operating multiple sensors for multiple instances of interconnected human activity recognition.

Related Art

Manufacturing a product involves a sequence of processes having both automated (machine) and manual operations. The time taken by a machine operation is usually fixed and can be measured by a Programmable Logic Controller (PLC). However, operations done by humans take a variable amount time which affect the overall yield of the product (e.g., how many parts are produced in a unit of time). In case of low yield, the factory manager would like to perform a root cause analysis such as monitoring the cycle time of human operations (e.g., time taken to complete a task) and spot statistics such as average time and trends such as start of delay, and so on.

Cycle time for an operation can be computed by performing Human Activity Recognition (HAR) at regular intervals of time and then measuring how much time a human spends in a given activity or task. HAR to detect one operation at one location or workstation in a factory is usually done through analysis of sensor data (e.g., such as cameras that monitor that location or workstation). However, there can be a need to perform HAR for multiple operations at multiple locations that correspond to all the processes through which a product proceeds.

One possible solution can be to install multiple sensors covering all the possible locations and workstations, and perform HAR independently over each received sensor data. If the sensors come with their own processing unit, then it may be possible to perform HAR locally. However, the future technology trends are moving heavily in the other direction, namely that of having dumb sensors transmitting their data to intelligent gateways. Indeed, one of the main use cases of 5G is 5G network sensors (like cameras) transmitting their data to a 5G Mobile Edge Computing (MEC) where the processing is done. However, this can be quite infeasible when considering practical bandwidth constraints as the number of processes (hence sensors) is high. If all sensors transmit all their monitoring data over a wireless network (5G or even WiFi) to the gateway, then network congestion can occur. Even if a wireless network is not used, and ethernet is used instead (for example, many legacy cameras are Power over Ethernet (PoE)), the issue then is that these sensor traffic will interfere with the important operations/IT related network traffic already being communicated over the wired network of the factory. Thus, there is need to perform HAR at multiple locations and for multiple processes in an intelligent manner without having to necessarily transmit all the sensor data from those locations and processes at all time instants when HAR needs to be performed.

In the related art, there is a system to predict worker action in an agricultural farm. Such related art systems assume access to sensor data that measure worker action at time 't', and based on a work management system database they predict the worker action at time 't+1'. However, such systems do not consider multiple workers in multiple areas and how the activities at these multiple areas may be interconnected. Also, there is no notion of how to deal with multiple sensors transmitting data simultaneously and causing congestion.

SUMMARY

Thus, there needs to be a system to operate multiple sensors for HAR when there is a constraint on total data that can be transmitted. To address the above issues, example implementations described herein involve systems and methods to operate multiple sensors for multiple instances of HAR. HAR can be performed if there are sufficient high-quality sensor data for monitoring that activity. However, due to data constraints it can be difficult to obtain high quality data from all sensors. In example implementations described herein, domain knowledge of factory activities can be used to infer HAR (for e.g. if at time 't−1' worker has finished putting items in cart at work area 1, then at time 't' worker is very likely to start pushing that cart towards work area 2 (the ideal behavior) or remain at work area 1 (cause for delay). Example implementations described herein involve a solution for HAR by utilizing the above points.

Example implementations described herein can recognize the place and kind of task executed, from the sensor data, and estimate a probability of each candidate of following tasks at each of plurality of areas for a specific period of future time, by referring to a historical data of task sequences previously executed. When, for a given area and for the specific period of future time, there is an estimated task with estimation accuracy score more than first threshold, the example implementations assume that estimated task to be correct. Otherwise, example implementations schedule sensors in that area for data transmission. For all scheduled sensors, the example implementations allocate data proportional to the number of possible tasks in that area and analyze sensor data, for the specific period of future time.

Aspects of the present disclosure can involve a method, which can involve dividing the location into a plurality of areas, each of the plurality of areas associated with one or more candidate tasks; recognizing, from sensor data, an area from the plurality of areas and a candidate task from the one or more candidate tasks associated with the area; estimating a probability of each of the plurality of candidate tasks for the each of the plurality of areas for a specific future period of time, based on referencing historical data of task sequences previously executed; accepting the ones of the plurality of candidate tasks for the each of the plurality of areas having the probability being higher than a threshold; and scheduling one or more sensors to activate and transmit in the specific future period of time in associated areas for the plurality of areas associated with other ones of the plurality of candidate tasks for the each of the plurality of areas not having the probability being higher than the threshold.

Aspects of the present disclosure can involve a computer program, which can involve instructions including dividing the location into a plurality of areas, each of the plurality of areas associated with one or more candidate tasks; recognizing, from sensor data, an area from the plurality of areas and a candidate task from the one or more candidate tasks associated with the area; estimating a probability of each of the plurality of candidate tasks for the each of the plurality of areas for a specific future period of time, based on referencing historical data of task sequences previously executed; accepting the ones of the plurality of candidate tasks for the each of the plurality of areas having the probability being higher than a threshold; and scheduling one or more sensors to activate and transmit in the specific future period of time in associated areas for the plurality of areas associated with other ones of the plurality of candidate tasks for the each of the plurality of areas not having the probability being higher than the threshold. The computer program and instructions can be stored in a non-transitory computer readable medium and executed by one or more processors.

Aspects of the present disclosure can involve a system, which can involve means for dividing the location into a plurality of areas, each of the plurality of areas associated with one or more candidate tasks; recognizing, from sensor data, an area from the plurality of areas and a candidate task from the one or more candidate tasks associated with the area; means for estimating a probability of each of the plurality of candidate tasks for the each of the plurality of areas for a specific future period of time, based on referencing historical data of task sequences previously executed; means for accepting the ones of the plurality of candidate tasks for the each of the plurality of areas having the probability being higher than a threshold; and means for scheduling one or more sensors to activate and transmit in the specific future period of time in associated areas for the plurality of areas associated with other ones of the plurality of candidate tasks for the each of the plurality of areas not having the probability being higher than the threshold.

Aspects of the present disclosure can involve an apparatus, which can involve a processor, configured to divide the location into a plurality of areas, each of the plurality of areas associated with one or more candidate tasks; recognize, from sensor data, an area from the plurality of areas and a candidate task from the one or more candidate tasks associated with the area; estimate a probability of each of the plurality of candidate tasks for the each of the plurality of areas for a specific future period of time, based on referencing historical data of task sequences previously executed; accept the ones of the plurality of candidate tasks for the each of the plurality of areas having the probability being higher than a threshold; and schedule one or more sensors to activate and transmit in the specific future period of time in associated areas for the plurality of areas associated with other ones of the plurality of candidate tasks for the each of the plurality of areas not having the probability being higher than the threshold.

Aspects of the present disclosure can involve an apparatus, which can involve a processor, configured to divide the location into a plurality of areas, each of the plurality of areas associated with one or more candidate tasks; recognize, from sensor data, an area from the plurality of areas and a candidate task from the one or more candidate tasks associated with the area; estimate a probability of each of the plurality of candidate tasks for the each of the plurality of areas for a specific future period of time, based on referencing historical data of task sequences previously executed; accept the ones of the plurality of candidate tasks for the each of the plurality of areas having the probability being higher than a threshold; and schedule one or more sensors to activate and transmit in the specific future period of time in associated areas for the plurality of areas associated with other ones of the plurality of candidate tasks for the each of the plurality of areas not having the probability being higher than the threshold.

Aspects of the present disclosure can involve a system, which can involve one or more sensors monitoring a plurality of areas, each of the plurality of areas associated with one or more candidate tasks; and an edge gateway, including a processor, configured to recognize, from sensor data from the plurality of sensors, an area from the plurality of areas and a candidate task from the one or more candidate tasks associated with the area; estimate a probability of each of the plurality of candidate tasks for the each of the plurality of areas for a specific future period of time, based on referencing historical data of task sequences previously executed; accept the ones of the plurality of candidate tasks for the each of the plurality of areas having the probability being higher than a threshold; and schedule the one or more sensors to activate and transmit in the specific future period of time in associated areas for the plurality of areas associated with other ones of the plurality of candidate tasks for the each of the plurality of areas not having the probability being higher than the threshold.

BRIEF DESCRIPTION OF DRAWINGS

FIG. 5 illustrates an example Task Description Table, in accordance with an example implementation.

FIG. 6 illustrates the Area to Task Mapping Table, in accordance with an example implementation.

FIG. 7 illustrates an example of the Task Duration table, in accordance with an example implementation.

FIG. 8 illustrates an example of the Task Sequence table, in accordance with an example implementation.

FIG. 10 illustrates an example of the task sequence table of the current task sequence DB, in accordance with an example implementation.

FIG. 13 illustrates example module periodicities upon which example implementations can be applied.

DETAILED DESCRIPTION

Figure 1:
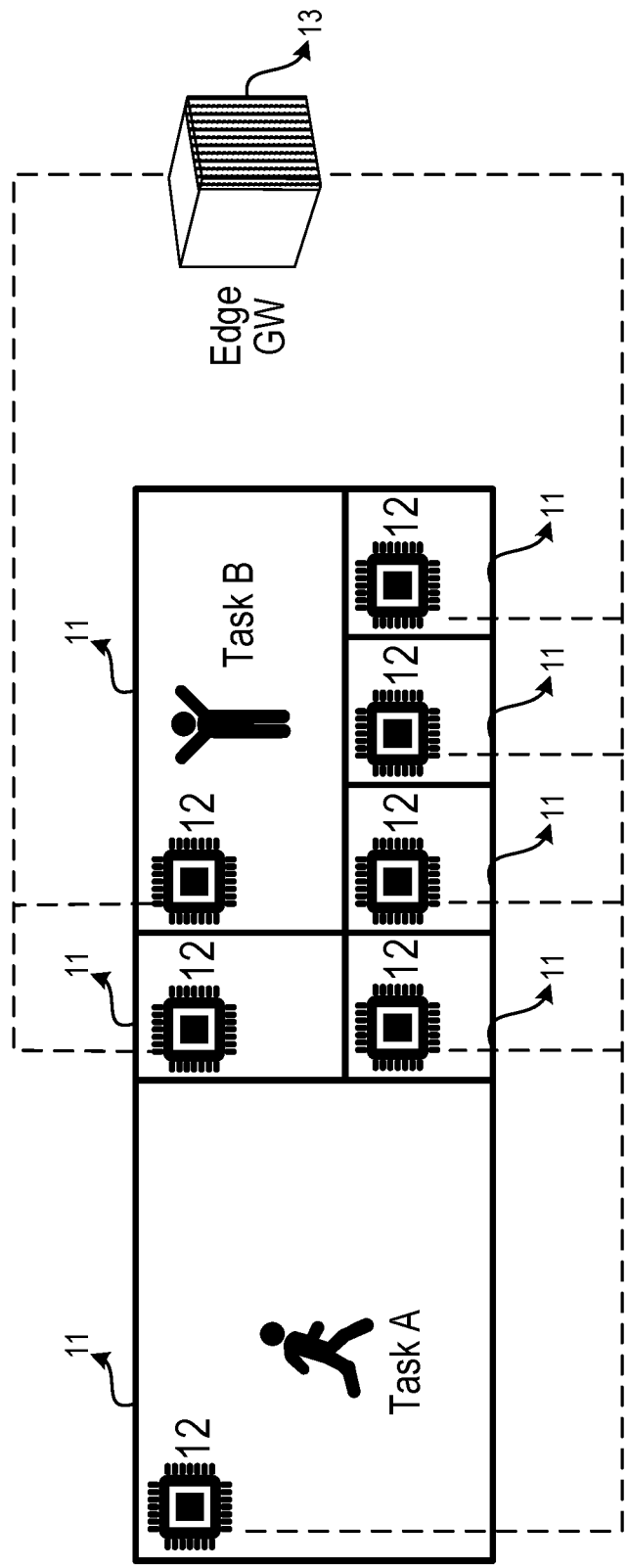
FIG. 1 illustrates a scenario from a manufacturing shop floor where the problems in the related art can arise.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates a scenario from a manufacturing shop floor where the problems in the related art can arise. Assume that the whole shopfloor is divided into areas 11 where a worker can perform various activities. Each area is monitored by a sensor. For example, sensor type 12 monitors area 11. In each area, the worker can perform some tasks. Examples of tasks can involve just walking past the area, pushing a cart, picking and placing objects, and so on depending on the desired implementations. Data from all sensors 12 are transmitted to and edge gateway (GW) 13. The edge (GW) 13 can control the amount of data transmitted from each individual sensor. For cameras, such data can be a combination of image resolution and image frame rate.

The proposed solution runs in the edge GW 13 and determines HAR for all areas 11 over time, through a combination of sensor data analysis and domain knowledge of human operations in factory. In this case the domain knowledge is captured by historical instances of the various sequences of tasks performed by the human operators and how much time was taken to perform the tasks. Note that this domain knowledge incorporates information about the spatio-temporal correlations in tasks done by a human worker across different areas and time instants. Due to the variable nature of human motion, deterministic knowledge is not obtainable and thus this domain knowledge is statistical in nature.

Example implementations described herein uniquely combines inexact/statistical domain knowledge with sensor data analysis. The number of areas in which to divide a shopfloor, $N_{Area}$ is a design parameter of the proposed solution. Larger $N_{Area}$ will facilitate more fine-grained recognition of worker activity, but deployment cost (number of sensors) and computation cost of HAR will be higher. In the proposed solution, there is an assumption that the area size is small enough so that at any given time, there is only one (or no) activity happening in that area.

Figure 2:
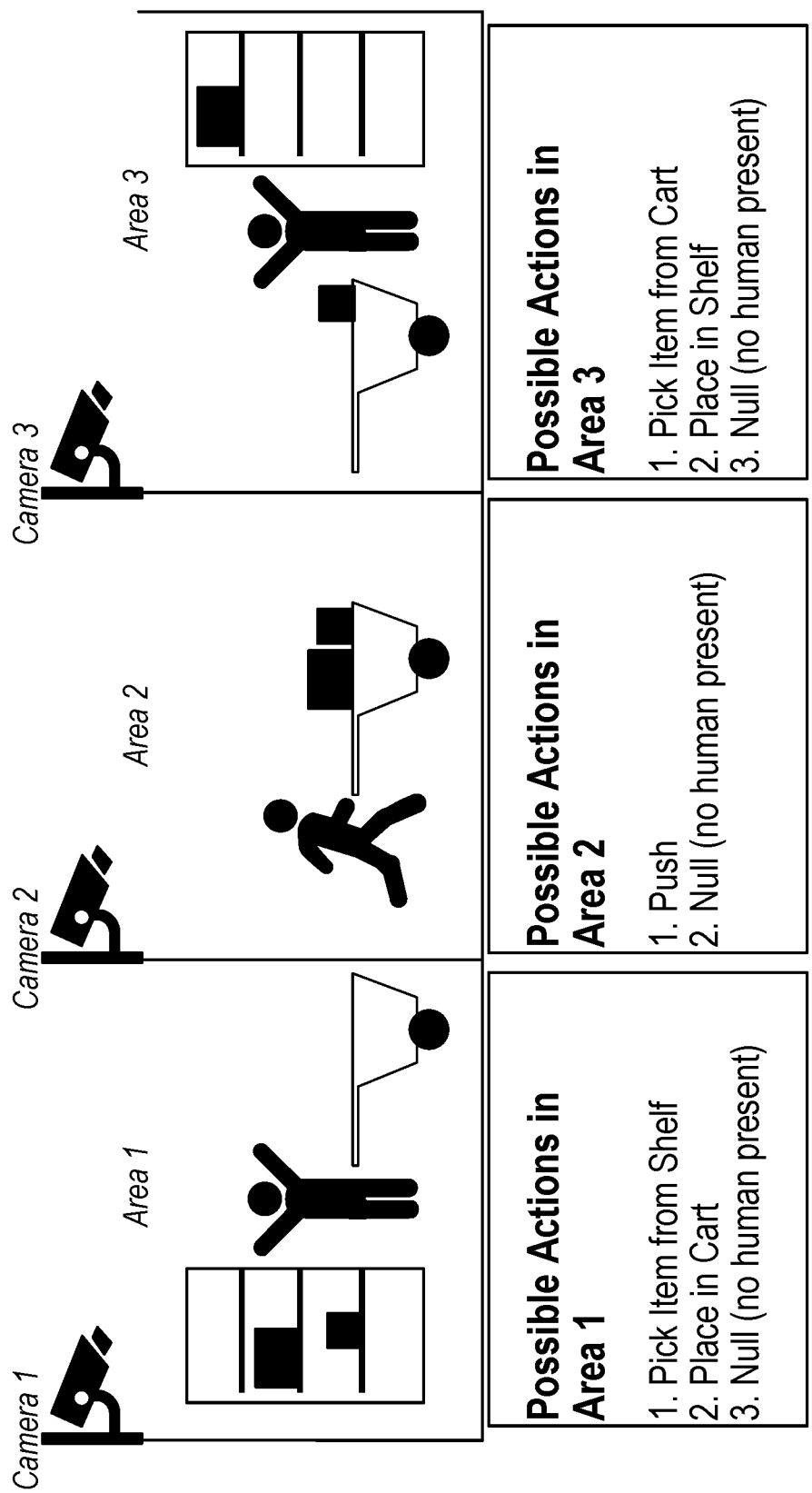
FIG. 2 is an illustrative example to provide the intuition behind the proposed solution.

FIG. 2 is an illustrative example to provide the intuition behind the proposed solution. Assume a shopfloor as shown in FIG. 2 with three areas and certain tasks that can be performed by a worker in those areas.

Assume that the actions at time 't-1' and 't' has been determined as follows where NULL means the absence of a worker in the given area.
1) Time='t-2'
   a. Estimated Action at Area 1='Place in Cart'
   b. Estimated Action at Area 2=NULL
   c. Estimated Action at Area 3=NULL
2) Time='t-1'
   a. Estimated Action at Area 1=NULL
   b. Estimated Action at Area 2='Push Cart'
   c. Estimated Action at Area 3=NULL The proposed solution works for determining actions at times 't'. The proposed solution will first try to estimate actions at Areas 1, 2, 3 based on domain knowledge (e.g. historical data of task sequences). For purposes of illustration, assume that there is a sequence which shows—'When worker starts pushing a cart, it takes at least one time instant'. Thus, since the worker started pushing cart at then with high estimation probability the following can be assumed
3) Time='t'
   a. Estimated Action at Area 1=NULL
   b. Estimated Action at Area 2='Push Cart'
   c. Estimated Action at Area 3=NULL For time instant 't+1', using domain knowledge is not useful for estimating actions at Areas 2 and 3 with high accuracy as the worker could have completed task and moved to Area 3 (ideal) or may be the worker is late and still in Area 2. Using domain knowledge is useful for estimating action at Area 1 (Null) with high accuracy. So, now sensor based HAR is used as follows:
  I. Schedule transmission from cameras 2 and 3 only.
  II. Allocate more data to Camera 3 than Camera 2 as Camera 3 data will be analyzed to differentiate between three actions while Camera 2 data will be analyzed to differentiate between two actions. Thus, activity classification analysis based on camera 3 must deal with more uncertainty and needs more data to achieve a similar performance to the analysis based on camera 2.

Below is the complete solution which generalizes the above simple example.

Figure 3:
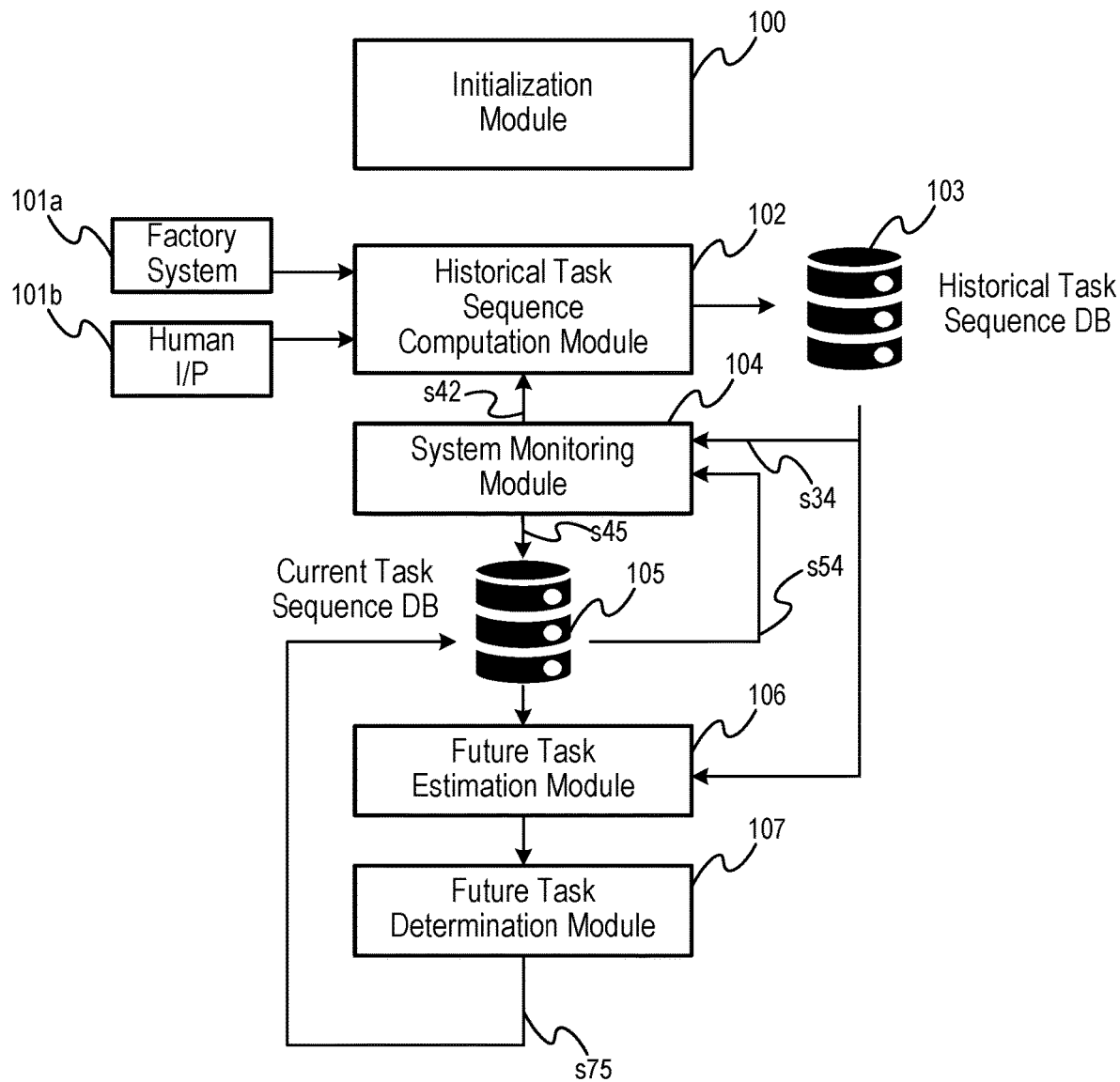
FIG. 3 illustrates a system diagram of the proposed solution, in accordance with an example implementation.

FIG. 3 illustrates a system diagram of the proposed solution, in accordance with an example implementation. Specifically, the system as illustrated in FIG. 3 can involve the following components.

In the example of FIG. 3, there is an initialization module 100 that sets various system parameters needed by the other solution modules. These include information about sensors used, number of areas, $N_{Area}$ where HAR will be performed, probability threshold $p_{th\_1}$ used in system reset module 104, probability threshold $p_{th\_2}$ used in future task determination module 107, time duration threshold Tar used in future task estimation module 106, and sliding time window length K used in current task sequence database (DB) 105.

One-time/periodic inputs from external systems are used to determine the domain knowledge. This includes input 101a from factory systems such as Manufacturing Execution System (MES) (e.g., production planning data, shift information), Enterprise Resource Planning (ERP) (e.g., worker information) and so on depending on the desired implementation. This also includes direct input 101b from plant/line managers in the factory who know how the workers should perform tasks, such as sequence and time.

Historical Task Sequence Computation Module 102 generates information about task sequences and times by taking into consideration various one-time/periodic inputs 101a, 101b and also more real time inputs from the System Monitoring Module 104.

Historical Task Sequence Database 103 stores all the domain knowledge about human tasks in form of task sequences and time taken.

System Monitoring Module 104 monitors the current task sequences and times taken, and checks if they are way off from the historical values stored in Historical Task Sequence Database 103. If not, then the entries of Historical Task Sequence Database 103 are updated with the current task sequences and times. If yes, then the system is reset by making all sensors transmit maximum data (for a short duration which is possible) so that HAR can be reliably performed for all work areas. In a way, this resets the algorithm to an initial state.

Current Task Sequence Database 105 stores the task sequences and times taken for all areas over a sliding time window of length K. Future Task Estimation module 106 estimates the task that will be performed in an area in the next time interval, based only on the task determined in the current time interval and the historical task sequences.

Future Task Determination module 107 decides if the estimate obtained in the Future Task Estimation module 106 is reliable. For all areas where it is not reliable, sensor data analysis based HAR is performed.

Figure 4:
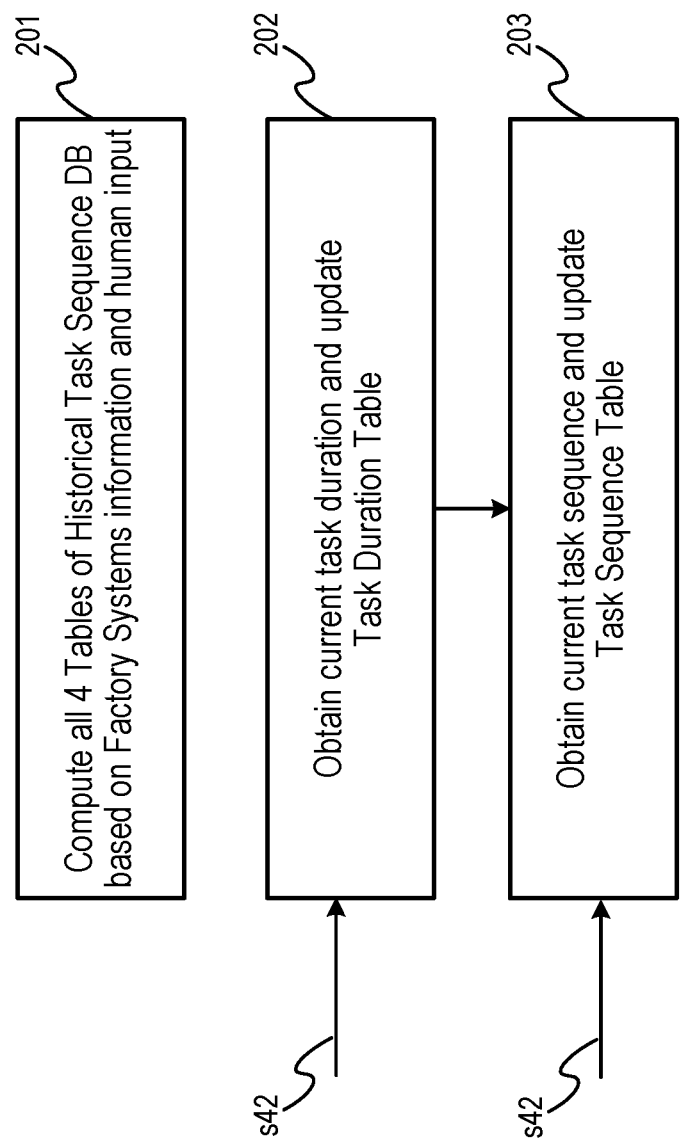
FIG. 4 illustrates the Historical Task Sequence Computational Module, in accordance with an example implementation.

FIG. 4 illustrates the Historical Task Sequence Computational Module, in accordance with an example implementation. In FIG. 4, the Historical Task Sequence Computational Module 102 involves the following steps.

In initial step 201, the module computes all the tables of the Historical Task Sequence Database 103, based on inputs 101a and 101b from modules described in FIG. 3. There are four tables that will be described herein below.

In step 202, the module obtains the current task duration and update the Task Duration Table as illustrated in FIG. 7.

In step 203, the module obtains the current task sequence and update the Task Sequence Table as shown in FIG. 8.

In example implementations described herein, there are four tables that make up the Historical Task Sequence Database 103. The first is the Task Description Table. FIG. 5 illustrates an example Task Description Table, in accordance with an example implementation. The key of this table is string $T_i$ denoting ID of the $i^{th}$ task. For each task the table stores the description of the task. The number of entries in this table is the number of possible and clearly distinguishable tasks that may be desired to be recognized and determined through the proposed solution.

Task $T_0$ is a special task which denotes absence of human worker or human worker performing a task which is not recognizable as any other task in the table.

FIG. 6 illustrates the Area to Task Mapping Table, in accordance with an example implementation. The key of this table is integer n denoting the area index. For each area n, the table shows the possible tasks that a worker can perform in area n. Note that this does not store the tasks in sequence, as there can be more than one sequence with the same tasks. The number of rows is the total number of areas $N_{Area}$, into which the shopfloor is divided.

FIG. 7 illustrates an example of the Task Duration table, in accordance with an example implementation. The key of this table is string $T_i$ denoting ID of the $i_{th}$ task. For each task, the table stores the statistics regarding how long it takes for a worker to complete the task. This statistics for the $i_{th}$ task is given by a mean $\mu_i$ and standard deviation $\sigma_i$ and a distribution $f_i(\mu_i, \sigma_i)$.

FIG. 8 illustrates an example of the Task Sequence table, in accordance with an example implementation. The key of this table is string $T_i$ denoting ID of the $i^{th}$ task. For task $T_i$, the table stores the probability of the next task when $T_i$ is completed.

Figure 9:
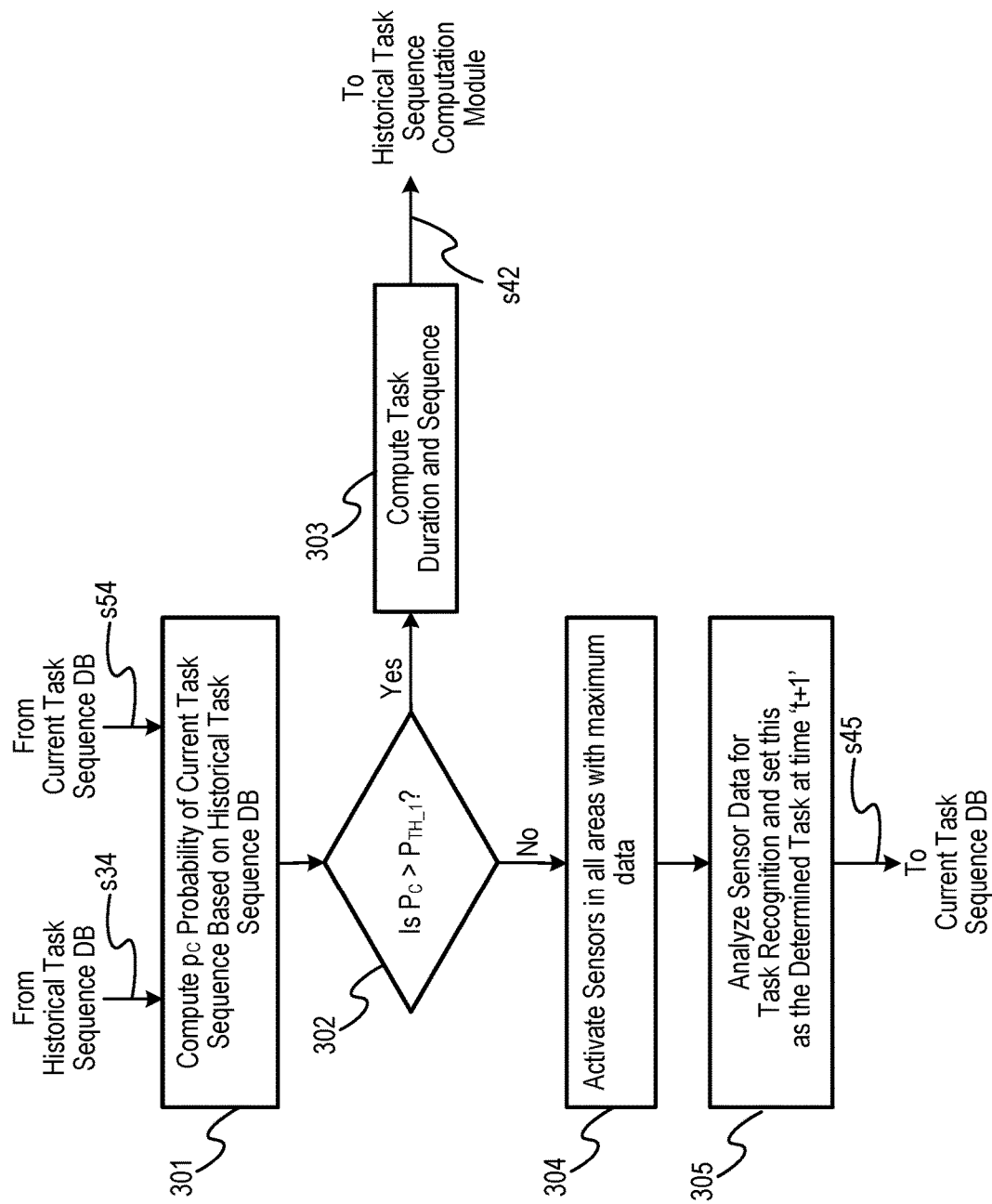
FIG. 9 illustrate an example of the Task Monitoring Module, in accordance with an example implementation.

FIG. 9 illustrate an example of the Task Monitoring Module 104, in accordance with an example implementation. The Task Monitoring Module 104 can involve the following steps.

Based on input s34 from the historical Task Sequence DB 103 and input s54 from Current Task Sequence DB 105, in step 301, the module computes the probability pC of the current task sequence based on already observed and verified historical task sequences. If a similar sequence has been already observed, then pC is high. The exact numerical value of pC can be computed by established statistical methods which are established in the related art.

The current task sequence is estimated and determined by the proposed solution (as will be illustrated with respect to the Future Task Estimation Module 106 and Future Task Determination Module 107). In step 302, the module checks for the accuracy of the algorithm by comparing pC as obtained in step 301 with a pre-determined threshold PIE 1.

If the accuracy is acceptable (Yes), then at step 303, the module updates the values of the historical task duration and sequences and send this value via signal s42 to update the Task Duration and Task Description Tables. This update can be done based on standard parameter update algorithms known in the related art.

If the accuracy is not acceptable (No), then the system has to be reset. This is because errors made in determining HAR at a given time can propagate to subsequent time instants. Thus at step 304, the module activates all sensors monitoring all areas with maximum data per sensor. Though this situation is an impossibility for continuous HAR, for a short duration of time this is possible. Indeed, at the first time step, when the algorithm is just started and the current task sequence DB 105 is empty, the sensor data based HAR is the only option available which requires the data from all areas, and hence all sensors for that time duration.

In step 305, the module analyzes all the sensor data, performs HAR, and send this information via signal s45 to the Current Task Sequence DB 105.

FIG. 10 illustrates an example of the task sequence table of the current task sequence DB 105, in accordance with an example implementation. The key of this table is integer n denoting the area index. For each area n, the table shows which tasks had been determined by the Future Task Determination Module 107 or by the System Monitoring Module 105 from the current time to K intervals in the past. Also note that the time instants (i.e. 't', 't−1', etc.) are normalized by the time interval Ts for ease of representation.

Figure 11:
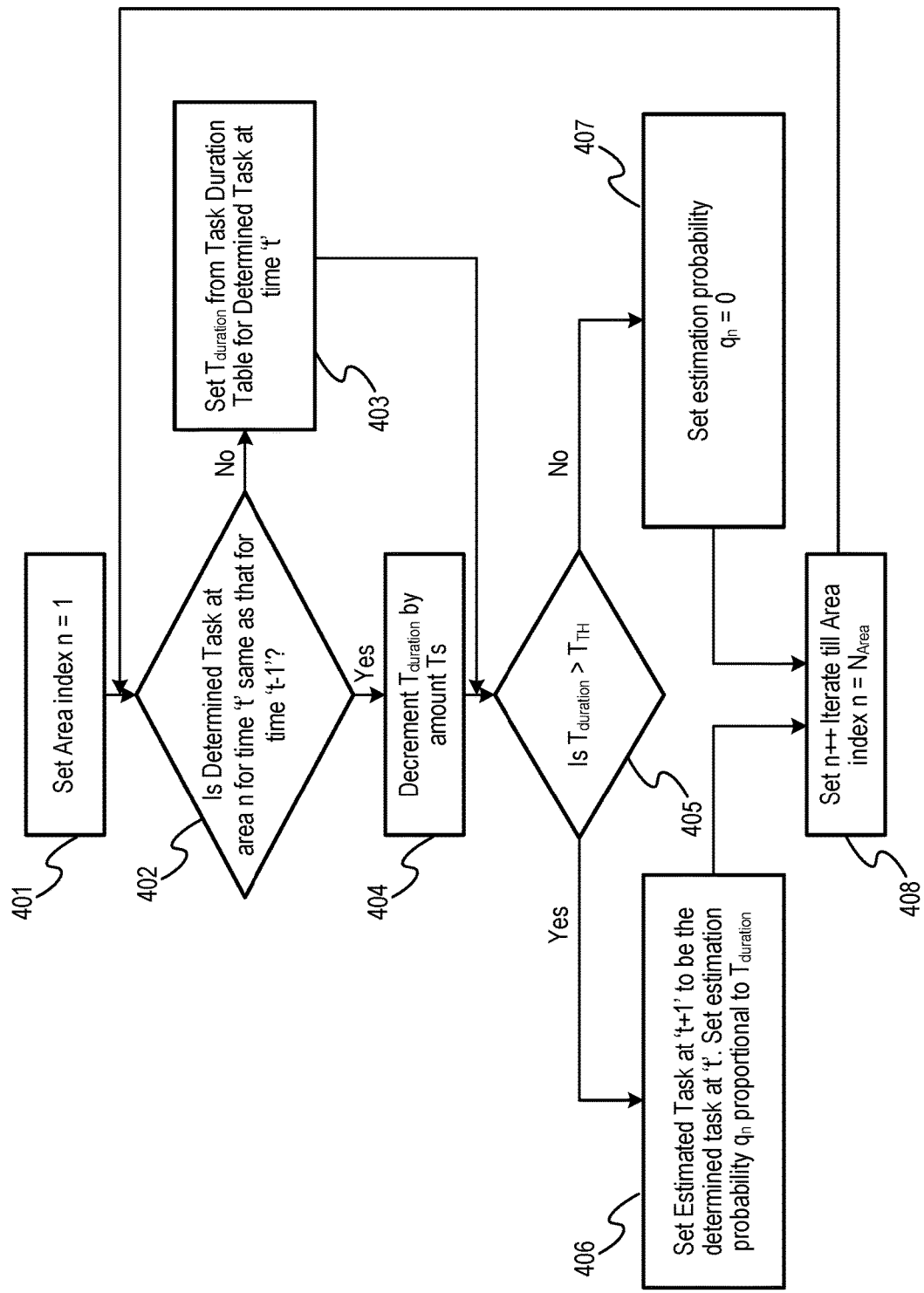
FIG. 11 illustrates the Future Task Estimation Module, in accordance with an example implementation.

FIG. 11 illustrates the Future Task Estimation Module, in accordance with an example implementation. Assume that from the current task sequence DB 105, the determined tasks at area 'n' for current time 't' and last interval 't−1' are known (denote them by $A_n(t)$ and $A_n(t-1)$) and $A_n(t+1)$ is to be estimated. The module can involve the following steps.

At step 401, the area index, n=1 is initialized for purposes of iteration.

At step 402, the module checks if $A_n(t)=A_n(t-1)$. If the answer is NO, then at step 402, the module knows that a new task had started in time t. Then at step 403, the module determines the possible duration of the task, $T_{duration}$ by sampling from the task duration distribution from Task Duration Table (FIG. 7). If the answer is YES at step 402, then the module knows that is a continuing task and $T_{duration}$ has already been computed before. Then at step 404, the module sets $T_{duration}=T_{duration}-TS$.

At step 405, the module checks if the remaining task duration is sufficiently large by comparing it with a predetermined threshold. If the answer is YES at step 405, then at step 406 the module assigns the estimate of $A_n(t+1)$ as $A_n(t+1)=A_n(t)$. The module sets the estimation confidence $q_n$ as a decreasing function of $T_{duration}$ computed at the current value of $T_{duration}$. If the answer is NO at step 405, then at step 407 the module sets estimation confidence $q_n=0$.

In step 408, the module checks if all the areas have been covered. If not, then the module increments n and repeat steps 402-407.

Figure 12:
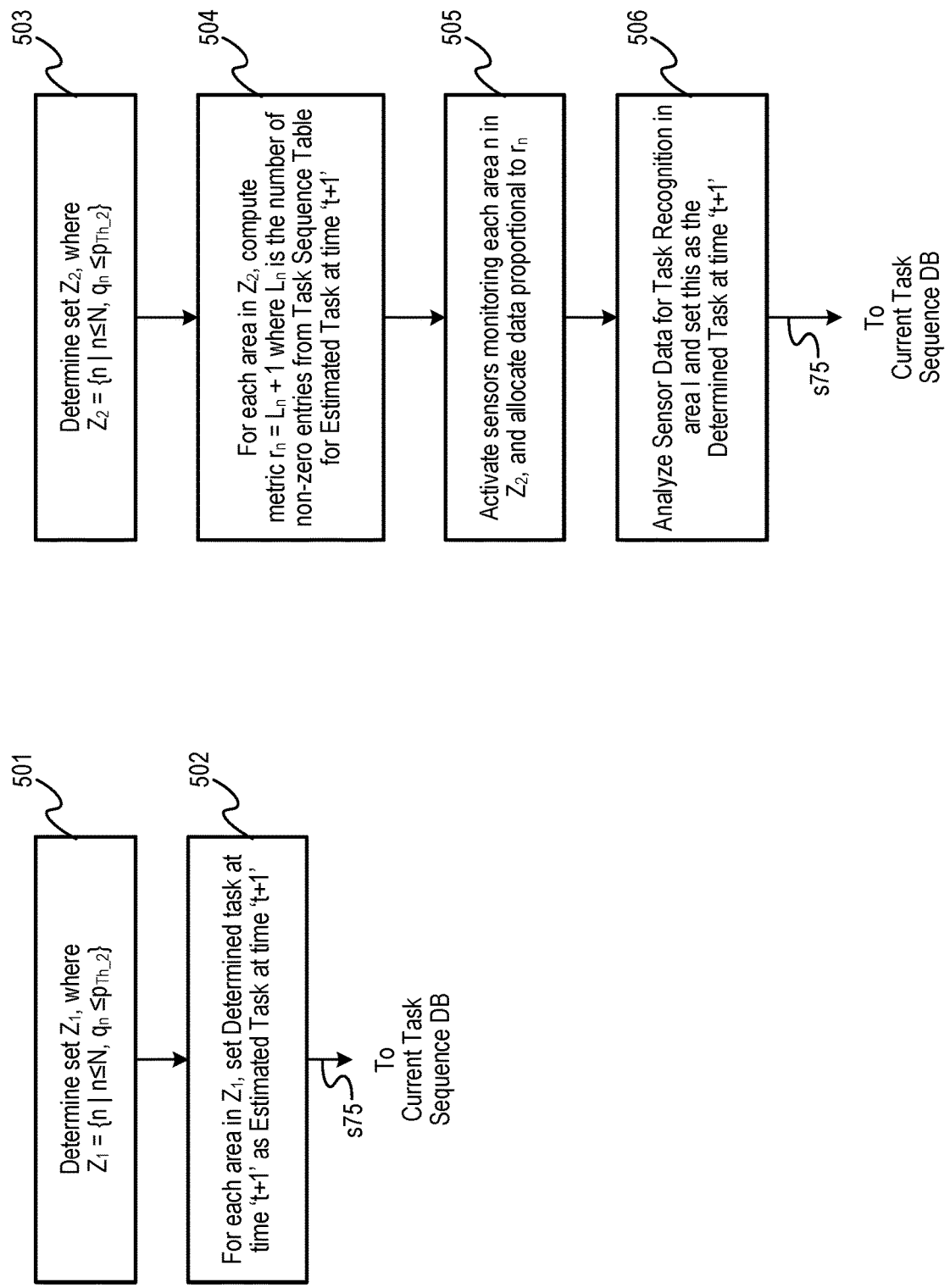
FIG. 12 illustrates the Future Task Determination Module, in accordance with an example implementation.

FIG. 12 illustrates the Future Task Determination Module, in accordance with an example implementation. The module can involve the following steps.

At step 501, the module determines a set of areas $Z_1$, such that for all areas, n, in $Z_1$, the estimated action $A_n(t+1)$ is determined to be accurate. a. For all such areas, at step 502 we assign estimated action $A_n(t+1)$ to be the final determined action for these areas n.

At step 503, the module determines a set of areas $Z_2$, such that for all areas, n, in $Z_2$, the module determines the estimated action $A_n(t+1)$ to be uncertain. a. For all such areas, at step 504, the module computes $r_n$, which is the number of tasks that are possible when the module tries to determine $A_n(t+1)$. This is the sum of non-zero entries in Task Sequence Estimation table for Task estimated at $A_n(t)$ plus one (as there is a chance that $A_n(t+1)=A_n(t)$ but that diagonal entries of Task Sequence Estimation table are zero).

At step 505, the module activates all sensors monitoring areas in $Z_2$ such that data transmitted by sensors at area n is proportional to $r_n$. This is based on the assumption that the HAR algorithm in an area with high $r_n$ will have to differentiate between more actions than area with low $r_n$. Thus, HAR in high $r_n$ area must tackle with more uncertainty and needs more data to achieve similar performance to HAR in low $r_n$ area.

FIG. 13 illustrates example module periodicities upon which example implementations can be applied. Example time intervals of operation are listed in FIG. 13 for the various modules in the example implementations described herein.

Through the example implementations described herein, it can be possible to reduce cost by optimally operating the sensors. Without the proposed solutions described herein there would be need to invest in more bandwidth purchase. Further, the proposed solutions are more efficient as it can incorporate domain knowledge than just doing data based analytics.

Figure 14:
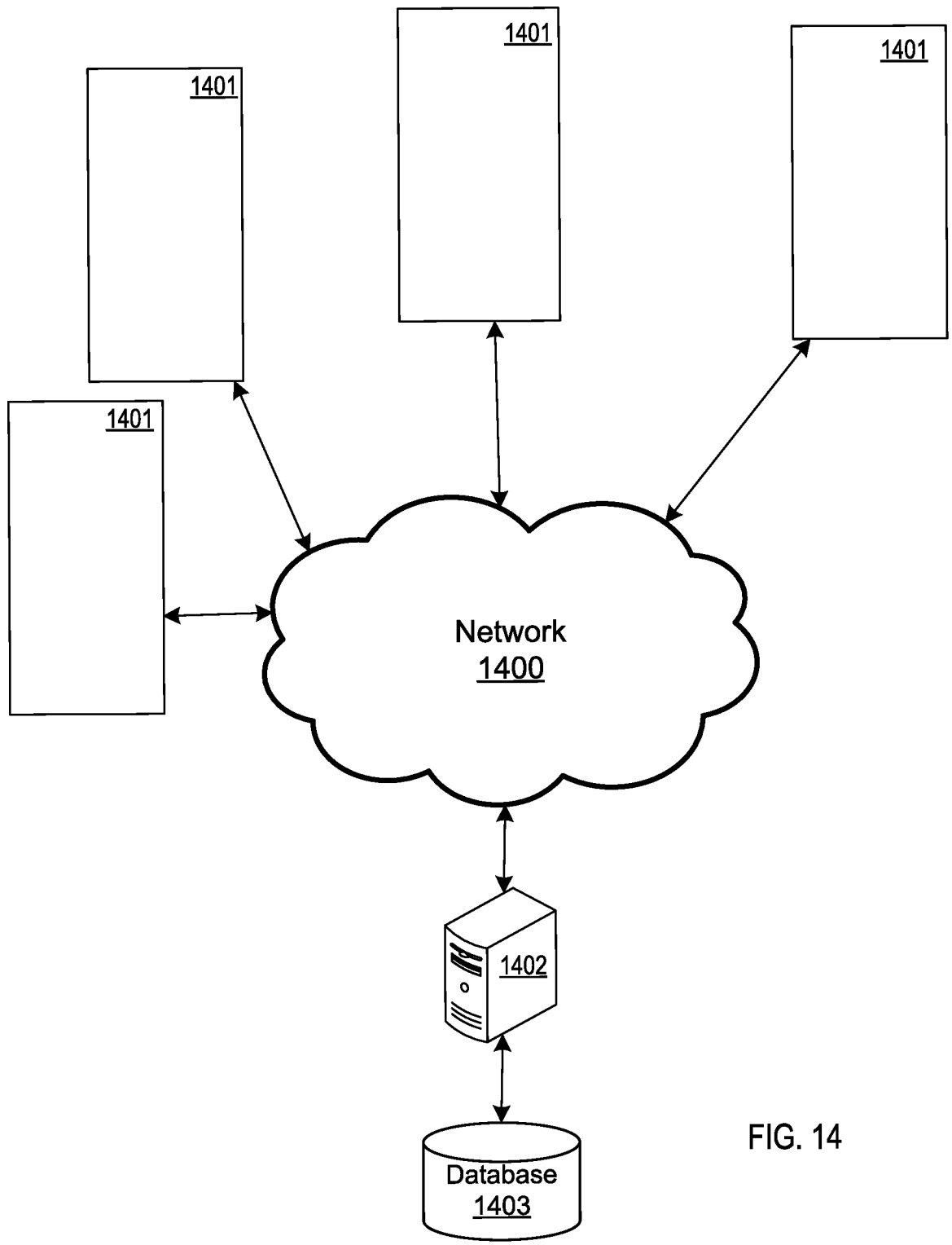
FIG. 14 illustrates a system involving a plurality of monitored areas networked to a management apparatus, in accordance with an example implementation.

FIG. 14 illustrates a system involving a plurality of monitored areas networked to a management apparatus, in accordance with an example implementation. One or more monitored areas 1401 (e.g., monitored by cameras and sensors dedicated to a particular area on a factory floor) are communicatively coupled to a network 1400 (e.g., local area network (LAN), wide area network (WAN)) through the corresponding robotic hardware controller, which is connected to a management apparatus 1402 such as an edge gateway. The management apparatus 1402 manages or is connected to a database 1403, which contains historical data collected from the monitored areas 1401. In alternate example implementations, the data from the monitored areas can be stored to a central repository or central database such as proprietary databases that intake data from monitored areas 1401, or systems such as enterprise resource planning systems, and the management apparatus 1402 can access or retrieve the data from the central repository or central database.

Figure 15:
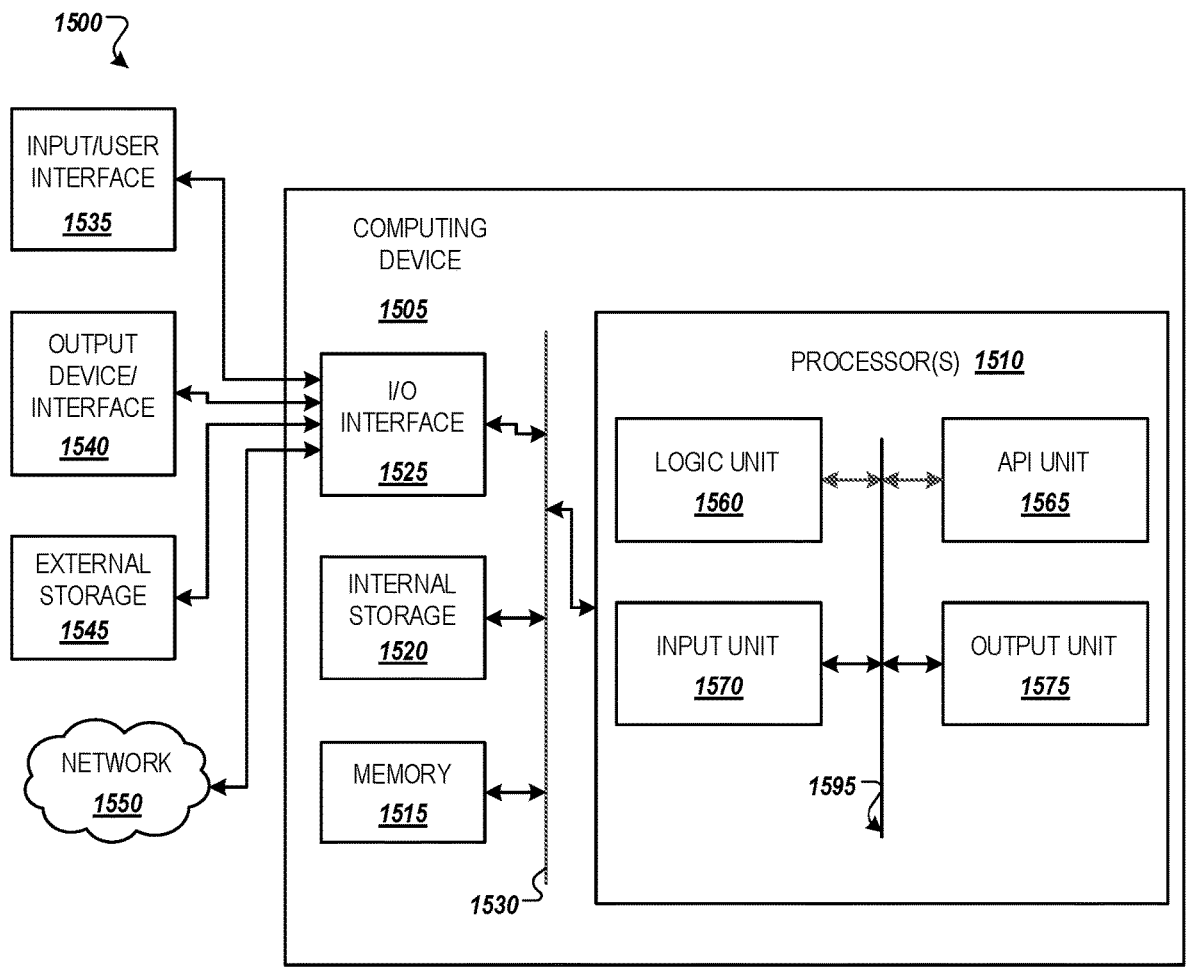
FIG. 15 illustrates an example computing environment with an example computer device suitable for use in some example implementations.

FIG. 15 illustrates an example computing environment with an example computer device suitable for use in some example implementations, such as a management apparatus/edge gateway 1402 as illustrated in FIG. 14. Computer device 1505 in computing environment 1500 can include one or more processing units, cores, or processors 1510, memory 1515 (e.g., RAM, ROM, and/or the like), internal storage 1520 (e.g., magnetic, optical, solid state storage, and/or organic), and/or I/O interface 1525, any of which can be coupled on a communication mechanism or bus 1530 for communicating information or embedded in the computer device 1505. I/O interface 1525 is also configured to receive images from cameras or provide images to projectors or displays, depending on the desired implementation.

Computer device 1505 can be communicatively coupled to input/user interface 1535 and output device/interface 1540. Either one or both of input/user interface 1535 and output device/interface 1540 can be a wired or wireless interface and can be detachable. Input/user interface 1535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1540 may include a display, television, monitor, printer, speaker, braille, or the like. In some example implementations, input/user interface 1535 and output device/interface 1540 can be embedded with or physically coupled to the computer device 1505. In other example implementations, other computer devices may function as or provide the functions of input/user interface 1535 and output device/interface 1540 for a computer device 1505.

Examples of computer device 1505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1505 can be communicatively coupled (e.g., via I/O interface 1525) to external storage 1545 and network 1550 for communicating with any number of networked components, devices, and systems, including one or more computer devices of the same or different configuration. Computer device 1505 or any connected computer device can be functioning as, providing services of, or referred to as a server, client, thin server, general machine, special-purpose machine, or another label.

I/O interface 1525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1500. Network 1550 can be any network or combination of networks (e.g., the Internet, local area network, wide area network, a telephonic network, a cellular network, satellite network, and the like).

Computer device 1505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1510 can execute under any operating system (OS) (not shown), in a native or virtual environment. One or more applications can be deployed that include logic unit 1560, application programming interface (API) unit

1565, input unit 1570, output unit 1575, and inter-unit communication mechanism 1595 for the different units to communicate with each other, with the OS, and with other applications (not shown). The described units and elements can be varied in design, function, configuration, or implementation and are not limited to the descriptions provided. Processor(s) 1510 can be in the form of hardware processors such as central processing units (CPUs) or in a combination of hardware and software units.

In some example implementations, when information or an execution instruction is received by API unit 1565, it may be communicated to one or more other units (e.g., logic unit 1560, input unit 1570, output unit 1575). In some instances, logic unit 1560 may be configured to control the information flow among the units and direct the services provided by API unit 1565, input unit 1570, output unit 1575, in some example implementations described above. For example, the flow of one or more processes or implementations may be controlled by logic unit 1560 alone or in conjunction with API unit 1565. The input unit 1570 may be configured to obtain input for the calculations described in the example implementations, and the output unit 1575 may be configured to provide output based on the calculations described in example implementations.

Processor(s) 1510 can be configured to divide the location into a plurality of areas, each of the plurality of areas associated with one or more candidate tasks as illustrated in FIGS. 1 and 2; recognize, from sensor data, an area from the plurality of areas and a candidate task from the one or more candidate tasks associated with the area as illustrated in FIG. 2; estimate a probability of each of the plurality of candidate tasks for the each of the plurality of areas for a specific future period of time, based on referencing historical data of task sequences previously executed as illustrated in FIGS. 9 to 11; accept the ones of the plurality of candidate tasks for the each of the plurality of areas having the probability being higher than a threshold as illustrated in FIGS. 9 to 11; and schedule one or more sensors to activate and transmit in the specific future period of time in associated areas for the plurality of areas associated with other ones of the plurality of candidate tasks for the each of the plurality of areas not having the probability being higher than the threshold as illustrated in FIGS. 11 and 12.

Processor(s) 1510 can be configured to allocate, for each of the scheduled one or more sensors, data that is proportional to a number of the associated one or more candidate tasks for the each of the plurality of areas associated with the scheduled one or more sensors, and analyze the sensor data from the scheduled one or more sensors for the specific future period of time for task recognition as illustrated in FIGS. 11 and 12.

Depending on the desired implementation, the one or more sensors comprise one or more cameras networked by a 5G network as described herein.

Processor(s) 1510 can be configured to monitor current task sequences derived from the plurality of candidate tasks and task duration for each of the current task sequences; and for a probability of the current task sequences being below a threshold from probabilities derived from referencing historical data of task sequences previously executed, schedule all sensors across all the plurality of areas to activate and transmit in the specific future period of time as illustrated in FIG. 3.

Processor(s) 1510 can be configured to estimate the probability of each of the plurality of candidate tasks for the each of the plurality of areas for a specific future period of time, based on referencing historical data of task sequences previously executed by computing a probability of one or more current task sequences from the plurality of candidate tasks based on the referencing of the historical data of task sequences previously executed; wherein the processor is configured to accept the ones of the plurality of candidate tasks for the each of the plurality of areas having the probability being higher than a threshold by computing a current task duration and a current task sequence from the one or more current task sequences from the accepted ones of the plurality of candidate tasks and storing the current task duration and the current task sequence into a database as illustrated in FIG. 9.

Depending on the desired implementation, the scheduled one or more sensors can be activated by the gateway, wherein the processor(s) 1510 can be configured to control the scheduled one or more sensors and to monitor a status of the scheduled one or more sensors as illustrated in FIGS. 12 to 14.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
dividing a location into a plurality of areas, each of the plurality of areas associated with one or more candidate tasks;
recognizing, from sensor data, an area from the plurality of areas and a candidate task from the one or more candidate tasks associated with the area;
estimating a probability of each of the plurality of candidate tasks for the each of the plurality of areas for a specific future period of time, based on referencing historical data of task sequences previously executed;
accepting ones of the plurality of candidate tasks for the each of the plurality of areas having the probability being higher than a threshold; and
for the each of the plurality of areas not having the probability being higher than the threshold, activating one or more sensors and transmitting sensor data received from the one or more sensors in the specific future period of time in associated areas for the plurality of areas associated with other ones of the plurality of candidate tasks,
wherein the estimating the probability of each of the plurality of candidate tasks for the each of the plurality of areas for a specific future period of time, based on referencing historical data of task sequences previously executed comprises computing a sequence probability of one or more current task sequences from the plurality of candidate tasks based on the referencing of the historical data of task sequences previously executed;
wherein the accepting the ones of the plurality of candidate tasks for the each of the plurality of areas having the probability being higher than a threshold comprises computing a current task duration and a current task sequence from the one or more current task sequences from the accepted ones of the plurality of candidate tasks and storing the current task duration and the current task sequence into a database.

2. The method of claim 1, further comprising allocating, for each of the scheduled one or more sensors, data that is proportional to a number of the associated one or more candidate tasks for the each of the plurality of areas associated with the scheduled one or more sensors, and
analyzing the sensor data from the scheduled one or more sensors for the specific future period of time for task recognition.

3. The method of claim 1, wherein the one or more sensors comprise one or more cameras networked by a 5G network.

4. The method of claim 1, further comprising monitoring current task sequences derived from the plurality of candidate tasks and task duration for each of the current task sequences; and
for the sequence probability of the current task sequences being below a threshold from probabilities derived from referencing historical data of task sequences previously executed, scheduling all sensors across all the plurality of areas to activate and transmit in the specific future period of time.

5. The method of claim 1, wherein the scheduled one or more sensors are activated by an edge gateway configured to control the scheduled one or more sensors and to monitor a status of the scheduled one or more sensors.

6. An apparatus, comprising:
a processor, configured to:
divide a location into a plurality of areas, each of the plurality of areas associated with one or more candidate tasks;
recognize, from sensor data, an area from the plurality of areas and a candidate task from the one or more candidate tasks associated with the area;
estimate a probability of each of the plurality of candidate tasks for the each of the plurality of areas for a specific future period of time, based on referencing historical data of task sequences previously executed;
accept ones of the plurality of candidate tasks for the each of the plurality of areas having the probability being higher than a threshold; and
for the each of the plurality of areas not having the probability being higher than the threshold, activate one or more sensors and transmit sensor data received from the one or more sensors in the specific future period of time in associated areas for the plurality of areas associated with other ones of the plurality of candidate tasks,
wherein the estimate the probability of each of the plurality of candidate tasks for the each of the plurality of areas for a specific future period of time, based on referencing historical data of task sequences previously executed comprises computing a sequence probability of one or more current task sequences from the plurality of candidate tasks based on the referencing of the historical data of task sequences previously executed;
wherein the accept the ones of the plurality of candidate tasks for the each of the plurality of areas having the probability being higher than a threshold comprises computing a current task duration and a current task sequence from the one or more current task sequences from the accepted ones of the plurality of candidate tasks and storing the current task duration and the current task sequence into a database.

7. The apparatus of claim 6, wherein the processor is configured to:
allocate, for each of the scheduled one or more sensors, data that is proportional to a number of the associated one or more candidate tasks for the each of the plurality of areas associated with the scheduled one or more sensors, and
analyze the sensor data from the scheduled one or more sensors for the specific future period of time for task recognition.

8. The apparatus of claim 6, wherein the one or more sensors comprise one or more cameras networked by a 5G network.

9. The apparatus of claim 6, wherein the processor is configured to:
monitor current task sequences derived from the plurality of candidate tasks and task duration for each of the current task sequences; and
for the sequence probability of the current task sequences being below a threshold from probabilities derived from referencing historical data of task sequences previously executed, schedule all sensors across all the plurality of areas to activate and transmit in the specific future period of time.

10. The apparatus of claim 6, wherein the scheduled one or more sensors are activated by the apparatus, wherein the processor is configured to control the scheduled one or more sensors and to monitor a status of the scheduled one or more sensors.

11. A system, comprising:
one or more sensors monitoring a plurality of areas, each of the plurality of areas associated with one or more candidate tasks; and
an edge gateway, comprising:
a processor, configured to:
recognize, from sensor data from the plurality of sensors, an area from the plurality of areas and a candidate task from the one or more candidate tasks associated with the area;
estimate a probability of each of the plurality of candidate tasks for the each of the plurality of areas for a specific future period of time, based on referencing historical data of task sequences previously executed;
accept ones of the plurality of candidate tasks for the each of the plurality of areas having the probability being higher than a threshold; and
for the each of the plurality of areas not having the probability being higher than the threshold, activate the one or more sensors and transmit sensor data received from the one or more sensors in the specific future period of time in associated areas,
wherein the estimate the probability of each of the plurality of candidate tasks for the each of the plurality of areas for a specific future period of time, based on referencing historical data of task sequences previously executed comprises computing a sequence probability of one or more current task sequences from the plurality of candidate tasks based on the referencing of the historical data of task sequences previously executed;
wherein the accept the ones of the plurality of candidate tasks for the each of the plurality of areas having the probability being higher than a threshold comprises computing a current task duration and a current task sequence from the one or more current task sequences from the accepted ones of the plurality of candidate tasks and storing the current task duration and the current task sequence into a database.

12. The system of claim 11, wherein the processor is configured to:
allocate, for each of the scheduled one or more sensors, data that is proportional to a number of the associated one or more candidate tasks for the each of the plurality of areas associated with the scheduled one or more sensors, and
analyze the sensor data from the scheduled one or more sensors for the specific future period of time for task recognition.

13. The system of claim 11, wherein the one or more sensors comprise one or more cameras networked by a 5G network.

14. The system of claim 11, wherein the processor is configured to:
monitor current task sequences derived from the plurality of candidate tasks and task duration for each of the current task sequences; and
for the sequence probability of the current task sequences being below a threshold from probabilities derived from referencing historical data of task sequences previously executed, schedule all sensors across all the plurality of areas to activate and transmit in the specific future period of time.

15. The system of claim 11, wherein the scheduled one or more sensors are activated by the edge gateway, and wherein the processor is configured to control the scheduled one or more sensors and to monitor a status of the scheduled one or more sensors.

* * * * *